United States Patent
Aoi et al.

[11] Patent Number: 5,681,527
[45] Date of Patent: Oct. 28, 1997

[54] MOLTEN METAL HOLDING APPARATUS

[75] Inventors: Tatsufumi Aoi; Noriyuki Kawada; Ritsuo Hashimoto; Kenichi Unoki; Motomi Nakashima; Kazumasa Mihara, all of Hiroshima, Japan

[73] Assignee: Mitsubishi Jukogyo Kabushiki Kaisha, Tokyo, Japan

[21] Appl. No.: 584,692

[22] Filed: Jan. 11, 1996

[51] Int. Cl.$^6$ ................................................ C21C 5/42
[52] U.S. Cl. ................................. 266/237; 222/594
[58] Field of Search ........................... 266/237, 200, 266/236; 222/591, 594

[56] References Cited

U.S. PATENT DOCUMENTS

| | | | |
|---|---|---|---|
| 3,980,284 | 9/1976 | Sigihara et al. | 266/237 |
| 4,842,170 | 6/1989 | Del Vecchio et al. | 266/237 |
| 5,186,886 | 2/1993 | Zerinvary et al. | 266/237 |

FOREIGN PATENT DOCUMENTS

| | | |
|---|---|---|
| 63-317656 | 12/1988 | Japan. |
| 3-118756 | 5/1991 | Japan. |
| 7-509277 | 10/1995 | Japan. |
| 7-509278 | 10/1995 | Japan. |

*Primary Examiner*—Scott Kastler
*Attorney, Agent, or Firm*—Wenderoth, Lind & Ponack

[57] ABSTRACT

In a molten metal holding apparatus in which an alternating magnetic flux is generated in the horizontal direction at a lower end portion of a molten metal and the molten metal 7 is held within an upper and lower opening container 6 by an electromagnetic force, solid conductors 8 which are not strong magnetic substances are attached to inner surfaces of both side plates 6x of a portion where the alternating magnetic flux passes through of the upper and lower opening container 6. Further, an apparatus including a circuit 3 to overlay a direct current on an exciting coil 2 or an exciting device 20 to let a direct current magnetic flux act is disclosed.

7 Claims, 11 Drawing Sheets

MOLTEN METAL HOLDING APPARATUS

BACKGROUND OF THE INVENTION

1. Field of the Invention

The present invention relates to an apparatus to hold a molten metal in the air, which apparatus can be applied to an electromagnetic valve of a molten metal, a molten metal plating apparatus, a high purity metal melting and floating apparatus, etc.

2. Description of the Prior Art

FIG. 13 shows a molten metal holding apparatus which is known in the prior art. An alternating current is supplied from an alternating current source 3 to a coil 2 wound around an iron core 5 and an alternating magnetic flux φ is generated in the right and left horizontal direction (X axis direction) in the figure between magnetic poles 5p, 5q. An upper and lower open container 6 made of a heat resistant insulating material is provided so that the position of a lower portion comes within the alternating magnetic flux φ generated between the magnetic poles 5p, 5q. In a molten metal 7, within the upper and lower opening container 6, an induction current is generated in the front and back direction (Y axis direction) in the figure by the alternating magnetic flux φ, and by a reciprocal action of the alternating magnetic flux φ and the induction current I (Fleming's rule), an electromagnetic force F is generated upwardly (Z axis direction) in the figure, and thus the electromagnetic force F levitates the molten metal 7. Thereby, the molten metal 7 is held within the upper and lower opening container 6. Incidentally, there are such prior arts relating to a molten metal holding means as Japanese laid-open patent applications Nos. Sho 63(1988)-109149, Hei 5(1993)-86449 and Hei 5(1993)-86450.

In a heretofore known molten metal holding apparatus as mentioned above, there are such shortcomings that, in FIG. 13 for example, when the alternating magnetic flux φ is in the rightward direction of X axis and the induction current I within the molten metal 7 is in the frontward direction of Y axis, the alternating magnetic flux φ is bent to the downward direction of Z axis, the direction of the electromagnetic force F is inclined from an upper portion of Z axis and an upward force of the electromagnetic force F is reduced and further that as a compression force fc in the direction of X axis is generated, the lower portion of the molten metal 7 is squeezed and falls as a liquid drop, thus the molten metal 7 cannot be held securely.

SUMMARY OF THE INVENTION

It is therefore an object of the present invention to provide a molten metal holding apparatus which does not reduce an upward force of an electromagnetic force F and is able to hold a molten metal stably so that the above-mentioned shortcomings in the prior art can be dissolved.

In order to attain the above-mentioned object, in a molten metal holding apparatus according to the present invention, a solid conductor which is not a strong magnetic substance is provided attachingly to an inner surface each of both side plates of a portion where an alternating magnetic flux passes through of an upper and lower opening container to hold a molten metal.

According to the present invention, as the solid conductors provided attachingly to the inner surfaces of both side plates of a portion where an alternating magnetic flux passes through of an upper and lower opening container to hold a molten metal are not strong magnetic substances, the alternating magnetic flux passes without much changing its shape, and although an induction current is generated also in the solid conductors, as the portion near the inner surfaces of both side plates where the solid conductors are provided is a portion where the magnetic flux is inclinedly bending and the upward force of the magnetic force is weak and further as the molten metal is supported only by a portion where the upward force of the electromagnetic force is strong between both solid conductors, the molten metal is held stably. Further, the induction current generated in the solid conductors and the induction current generated in the molten metal are both in a same direction and both solid conductors draw the molten metal, thus a squeezing of the molten metal is prevented.

The solid conductors used in an apparatus according to the present invention are preferably of a conductivity of a same degree as the molten metal. By use of such solid conductors having a conductivity of a same degree as the molten metal, the induction current generated in said solid conductors becomes same as that generated in the molten metal and the above-mentioned functions can be attained without problem.

One preferable form of solid conductors used in an apparatus according to the present invention is of such a construction that a solid conductor of which cross section is nearly triangular is provided attachingly to an inner surface each of both side plates of the upper and lower opening container so that its vertical face is fitted to an inner surface each of said side plates, its inclined face is directed to the inside of the upper and lower opening container and its bottom face is downward. By use of such a solid conductor of which cross section is nearly triangular being provided so that its vertical face is fitted to the inner surface each of both side plates of an upper and lower opening container, its inclined face is directed to the inside of the upper and lower opening container and its bottom face is downward, the molten metal within the upper and lower opening container contacts the inclined faces of both solid conductors and is supported on a narrow place between the tip portions of the bottom faces of both nearly triangular solid conductors, thus the molten metal being supported on a narrow horizontal sectional area by a strong levitating electromagnetic force of a central portion can be held stably.

Further, in order to attain the above-mentioned object, in an apparatus according to the present invention, there is provided a cooling water pipe so that a molten metal is cooled to be solidified and sticks to the inner surface each of both side plates of a portion where an alternating magnetic flux passes through of an upper and lower opening container to hold the molten metal. By use of such construction to form a solidified metal by a cooling water pipe, the molten metal is held stably by the same functions as mentioned above.

According to a further construction of the present invention to attain the above-mentioned object, a molten metal holding apparatus, in which an alternating magnetic flux is generated by use of an exciting coil in the horizontal direction at the lower end portion of the molten metal to be held and the molten metal is held in the air by an electromagnetic force, includes a circuit to overlay a direct current on the exciting coil or a device to let a direct current magnetic flux act on the molten metal.

As exemplified in FIG. 8, upon an exciting coil 2 being supplied with an alternating current as well as with a direct current from a direct current source 17, an exciting current 18 of wave shapes, as shown in FIG. 9, in which the direct current is overlaid on the alternating current, flows in the exciting coil 2. With such flow of the exciting current 18 in the exciting coil 2, an alternating magnetic flux φ of wave shapes including a direct current component 19, as shown in FIG. 10, is generated between magnetic poles 5p, 5q.

While an alternating current component of the alternating magnetic flux φ alternates at a surface layer of a molten metal 7, the direct current component 19 acts strongly on the inside of the molten metal 7. Accordingly, if the molten metal 7 which is a conductor flows in the direction to cross the magnetic flux φ, or in the direction of Y axis or Z axis, an induction current I flows in the molten metal 7 and a reciprocal action force of the induction current I and a direct current component 19 of the alternating magnetic flux φ acts in a direction to suppress the flow, thus the molten metal 7 is held stably.

Further, as shown in FIG. 11, instead of a circuit to overlay a direct current on an exciting coil 2, even if an exciting device 20 to let a direct current magnetic flux act on a molten metal 7 is used, a direct current component 19 is generated at an alternating magnetic flux φ by supplying a direct current to the exciting device 20 from a direct current source 17. By use of such construction also, a reciprocal action force of the induction current I and a direct current component 19 of the alternating magnetic flux φ acts in a direction to suppress a flow and a liquid flow within the molten metal is reduced against a compression force fc which is a component force in the direction of X axis, thus the molten metal 7 can be held stably.

Further, in a molten metal holding apparatus according to the present invention, a combination of said solid conductor or cooling water pipe and said circuit to overlay a direct current or device to let a direct current magnetic flux act, can be used to attain the mentioned object.

The present invention provides also a molten metal plating apparatus characterized in a container, having an upper opening and a lower opening, in which a molten metal is contained and through which an element to be plated passes from the lower opening to the upper opening; an exciting coil means provided around the outer circumference of the lower end portion of the container to prevent the molten metal from flowing out of the lower opening of the container by letting an electromagnetic force act on the molten metal within the container; a solid conductor, having a conductivity of a same degree as the molten metal, provided projectingly on each of the inner surfaces of the lower opening of the container; and a molten metal supplying and discharging means to supply and discharge the molten metal into and from the container.

Further, the molten metal plating apparatus is preferably so constructed as to include a pretreatment equipment to wash and degrease the element to be plated; an annealing furnace to anneal the element to be plated come out of the pretreatment equipment; a plating apparatus to pass the element to be plated come out of the annealing furnace from the lower opening to the upper opening; a plating thickness adjusting means disposed downstream of the plating apparatus; and a cooling zone disposed downstream of the plating thickness adjusting means.

BRIEF DESCRIPTION OF THE DRAWINGS

In the accompanying drawings:

FIGS. 3(A), 3(B) and 3(C) show actions of the molten metal holding apparatus of FIG. 1, wherein FIG. 3(A) is a sectional view of an enlarged main portion, FIG. 3(B) is a side sectional view of a central portion and FIG. 3(C) is a side sectional view of a portion of a solid conductor.

DESCRIPTION OF THE PREFERRED EMBODIMENTS

Following are descriptions of preferred embodiments according to the present invention.

Figure 1:
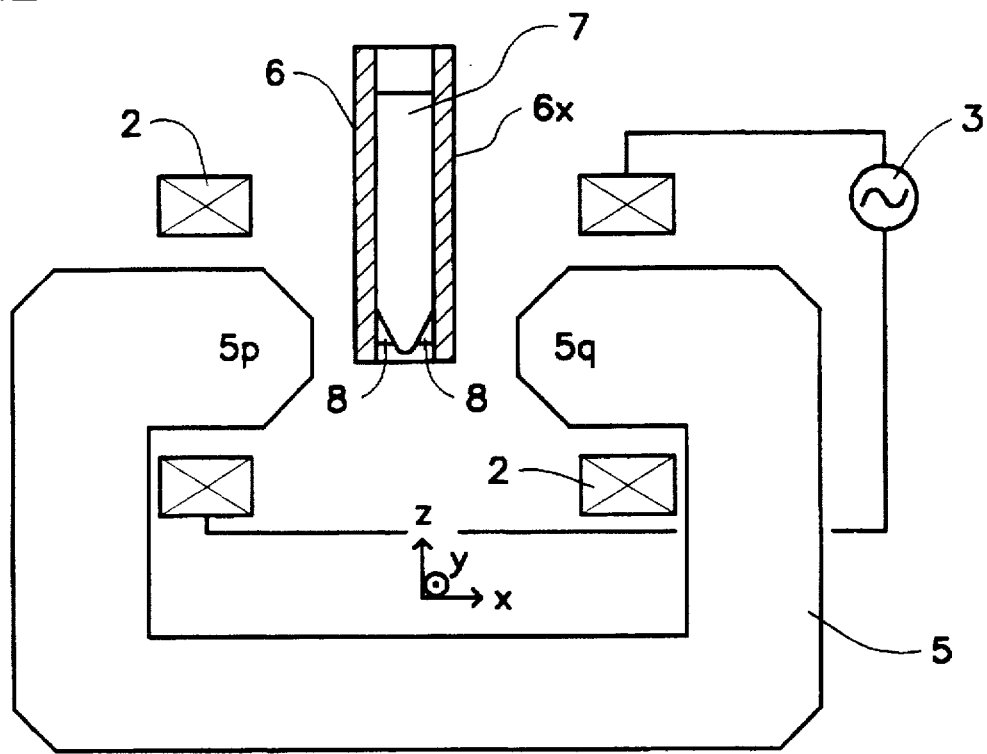
FIG. 1 is a longitudinal sectional view of a molten metal holding apparatus of a first preferred embodiment according to the present invention.

FIG. 1 is a longitudinal sectional view of a molten metal holding apparatus of a first preferred embodiment according to the present invention. In the figure, numeral 2 designates a coil, numeral 3 designates an alternating current source to supply an alternating current to the coil 2, numeral 5 designates an iron core, around which the coil 2 is wound, disposed so that a strong magnetic field and magnetic flux is generated between magnetic poles 5p, 5q of the iron core 5. Numeral 6 designates an upper and lower opening container for holding a molten metal. The container 6 is made of a heat resistant insulating material, such as ceramic; and is formed in a rectangular tube shape with its upper and lower end portions being open. The container is also disposed vertically in such a direction that a longer side of the rectangular tube shape extends in the front and back direction of the figure so that the lower portion thereof is positioned at a place where the magnetic flux between the magnetic poles 5p, 5q passes.

As shown in FIG. 1, there is provided a solid conductor 8 attached to each inner surface of both side plates 6x facing the magnetic poles 5p, 5q of the lower portion of the upper and lower opening container 6. The material of the solid conductor 8 is one which is not a strong magnetic substance, that is, an aluminum, a tungsten, etc. which is a normal magnetic substance, or a copper, a lead, a zinc, etc. which is a non-magnetic substance. It can be a high manganese steel, a stainless steel, a stainless alloy, a zinc alloy, etc. which are not a strong magnetic substances. As shown in FIG. 1, a front sectional shape of the solid conductor 8 is triangular, with the vertical face fitted to each of the inner surfaces side plates 6x. Also, the inclined face is directed to the inside of the upper and lower opening container 6 and the bottom face is downward. Molten metal 7 is supplied into the upper and lower opening container 6 and is held by an electromagnetic force as described below.

Figure 3:
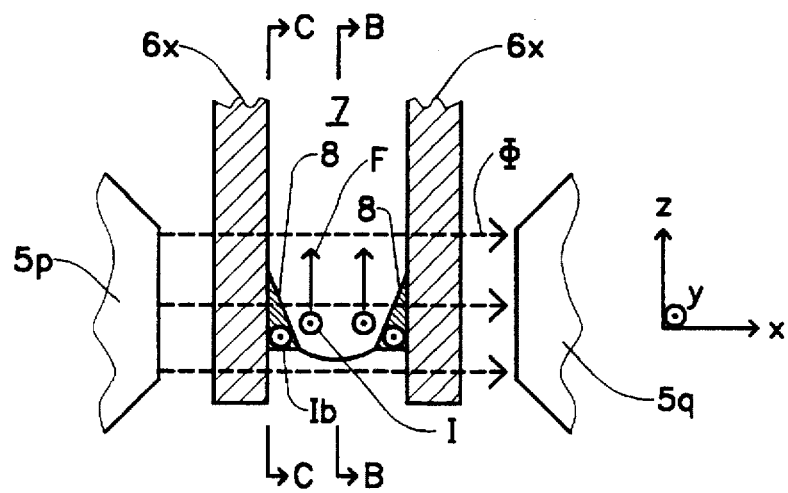
Figure 3:
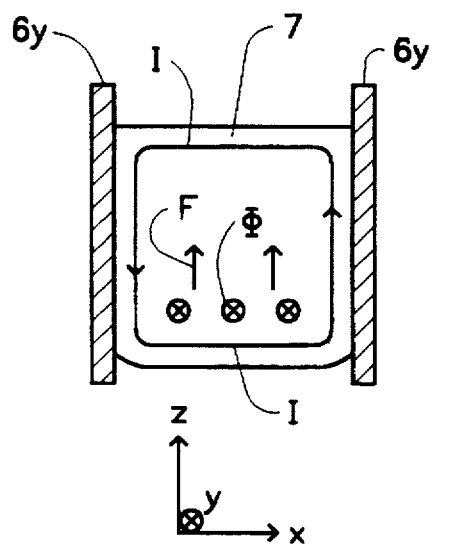
Figure 3:
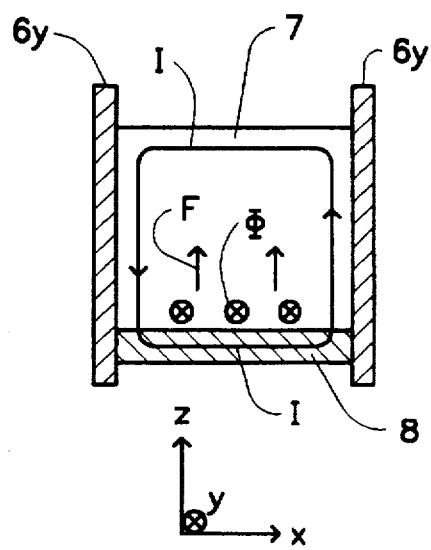

Functions of the preferred embodiment shown in FIG. 1 are described. In FIG. 1, coordinates are so set that X axis is along the right and left direction wherein the right direction is a positive direction, Y axis is along the front and back direction wherein the front direction is a positive direction, and Z axis is along the upper and lower direction wherein the upper direction is a positive direction. Upon an alternating current being supplied from an alternating current source 3 to a coil 2, an alternating magnetic field is generated between magnetic poles 5p, 5q of an iron core 5, and as shown enlargedly in FIG. 3(A), an alternating magnetic flux $\phi$ passes in the X axis direction, an induction current I within the molten metal 7 and an induction current Ib within the solid conductor 8, respectively, flow in the Y axis direction by change of the magnetic flux $\phi$ and a Lorentz's electromagnetic force F is generated in the Z axis direction by Fleming's rule. FIG. 3(B) shows a side sectional view of a central portion of the upper and lower opening container and FIG. 3(C) shows a side sectional view through a portion of the solid conductor 8. In FIGS. 3(B) and 3(C), X axis is in the front and back direction of the figure, Y axis is in the right and left direction and Z axis is in the upper and lower direction. As shown in FIGS. 3(B) and 3(C), the induction current I makes, for example, such a circulation flow that the flow is from the left to the right at the lower portion of the molten metal 7, then goes up on the right side and is from the right to the left at the upper portion of the molten metal and then goes down on the left side. There is an alternating magnetic flux $\phi$ at the lower portion of the molten metal 7 and an upward electromagnetic force F is generated by a reciprocal action of the alternating magnetic flux $\phi$ and the induction current I.

As shown in FIG. 3(A), in a molten metal holding apparatus of this preferred embodiment, there is provided a solid conductor 8 attached to the lower inner surface both side plates 6x of the upper and lower opening container 6, and as the solid conductor is not a strong magnetic substance, the alternating magnetic flux $\phi$ passes through the solid conductor 8 without much changing its shape and an induction Current Ib is generated and also flows within the solid conductor. As the alternating magnetic flux $\phi$ bends at this portion as mentioned above, the electromagnetic force F also inclines so that a size of the upward force of the electromagnetic force F is reduced, but as there are solid conductors 8 fitted on the side plates 6, the reduced upward force of the electromagnetic force F is made up by the solid conductors 8 without and influence on the molten metal 7. At the portion where the alternating magnetic flux $\phi$ passes nearly in the horizontal direction between both solid conductors 8, there is a molten metal 7, and an upward electromagnetic force F is generated within the molten metal 7 and acts to levitate the molten metal 7 without reducing the upward force of the electromagnetic force F. Thus, the molten metal 7 is held stably. Further, as the induction current Ib generated in the solid conductors 8 and the induction current I generated in the molten metal 7 are both in the same direction, the solid conductors 8 draw the molten metal 7, thus a squeezing effect acts on the molten metal 7, which prevents the molten metal 7 from dropping and a stable holding of the molten metal 7 is ensured.

As for the molten metal 7, a zinc, an aluminum, other metals, their alloys, etc. are used, and the frequency of the alternating current supplied from the alternating current source 3 is preferably in a range of approximately 1 to 10 kHz.

Figure 4:
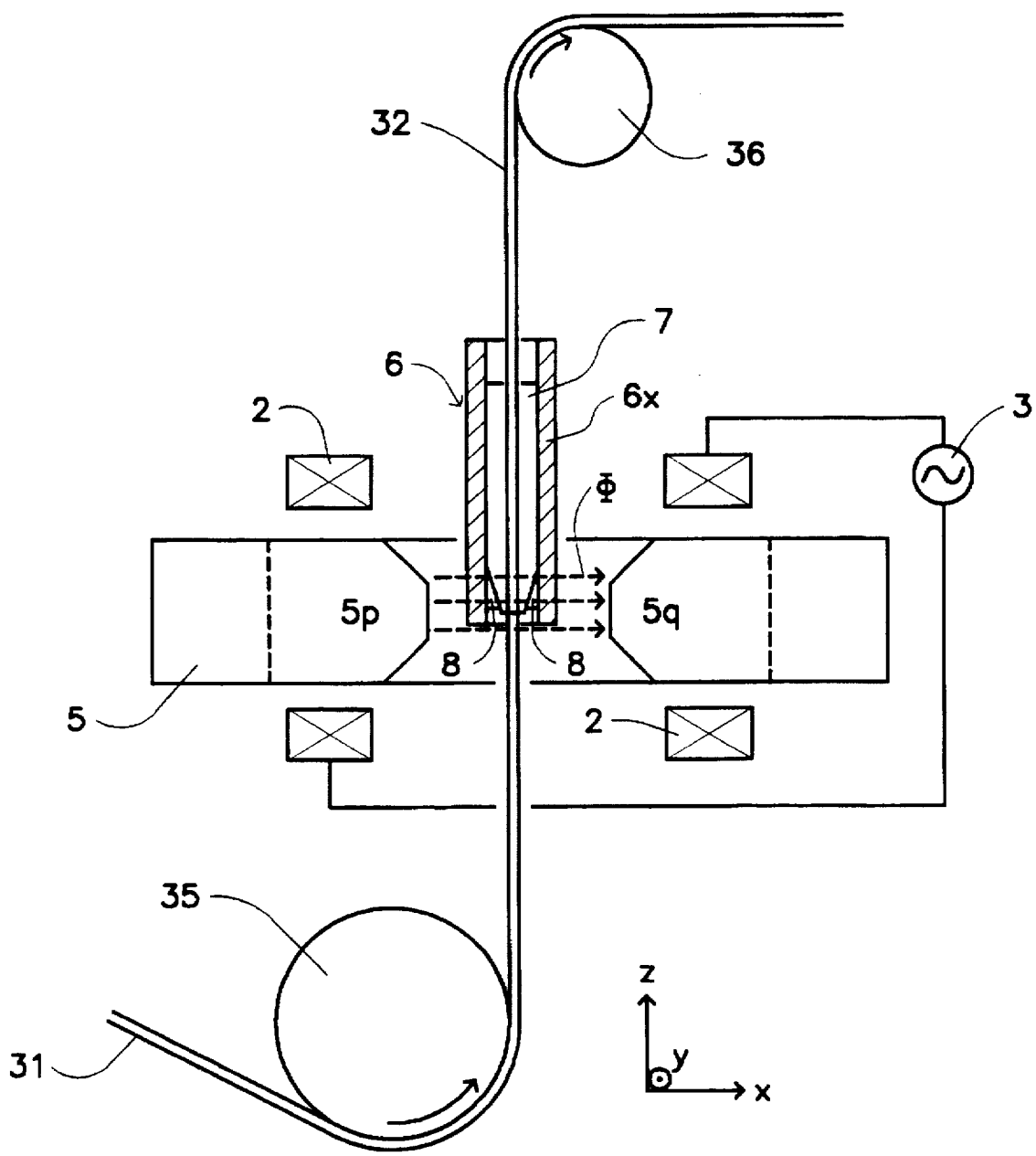
FIG. 4 is a longitudinal sectional view of a molten metal holding apparatus according to the present invention, applied to a plating apparatus.
Figure 6:
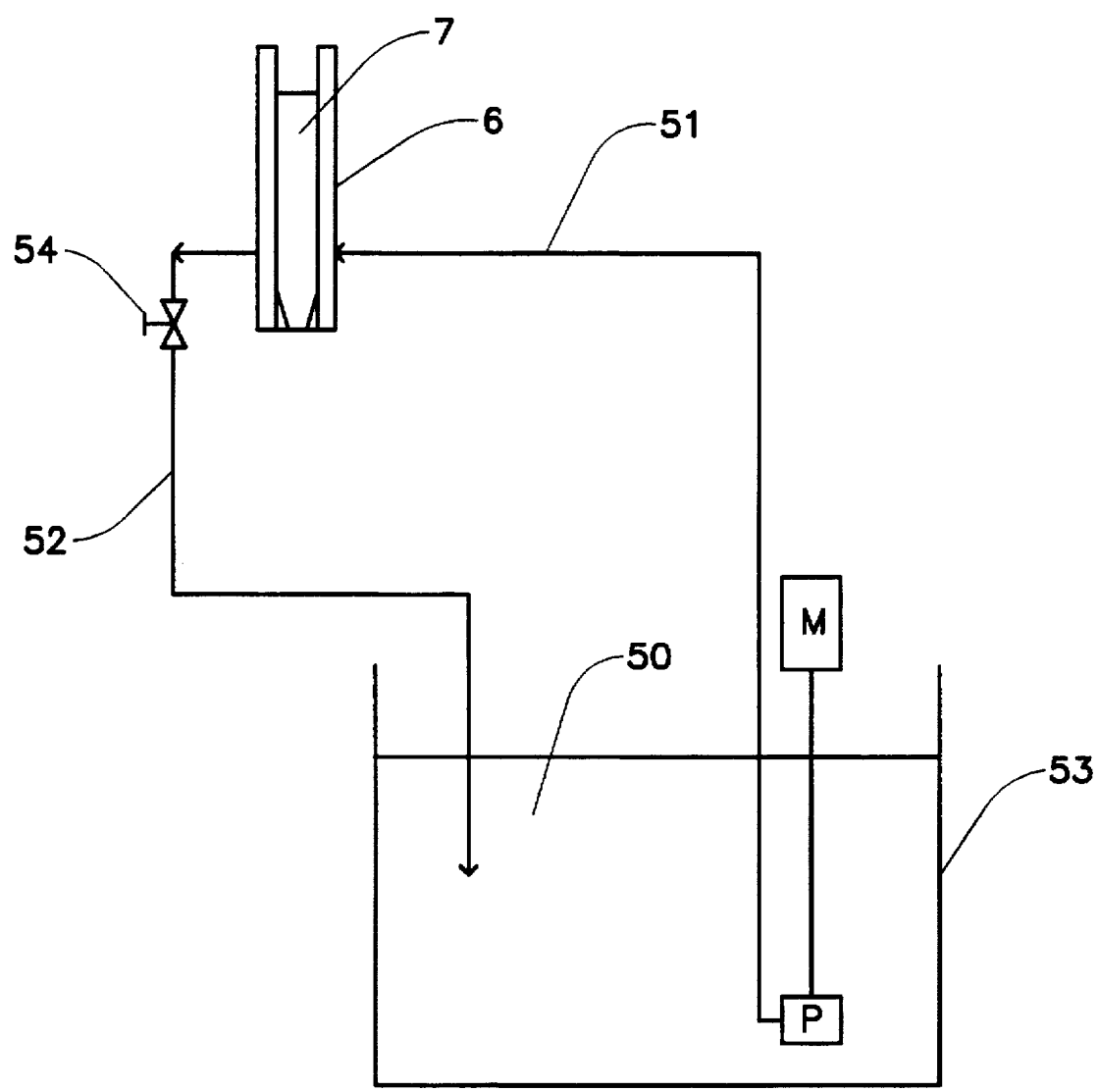
FIG. 6 is a diagrammatic drawing of a molten metal circulation of a molten metal holding apparatus according to the present invention, applied to a plating apparatus.
Figure 7:
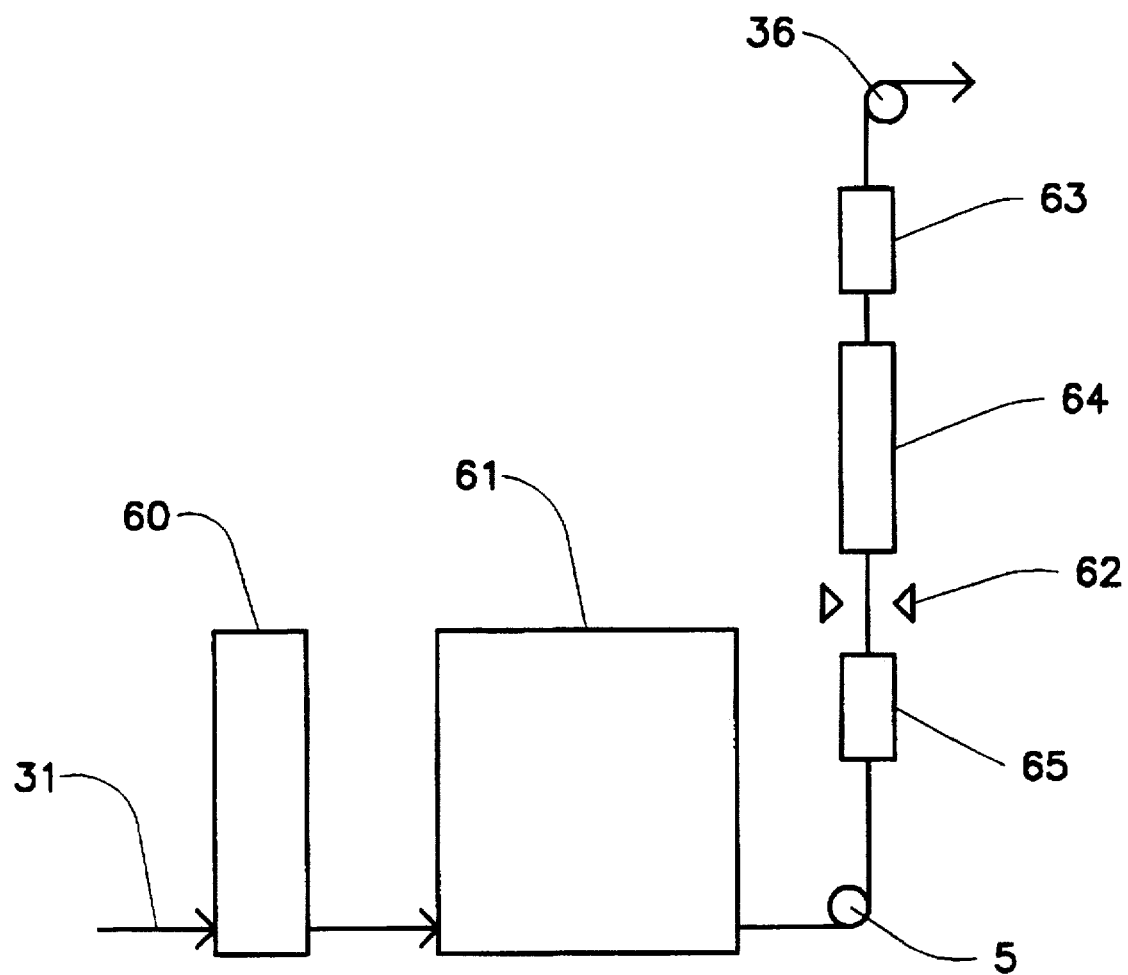
FIG. 7 is a diagrammatic drawing showing an example where a molten metal holding apparatus according to the present invention is incorporated in a continuous plating apparatus including its upstream and downstream apparatus.

FIGS. 4, 6 and 7 show examples where the molten metal holding apparatus is applied to a plating apparatus. Upon an alternating current being supplied from an alternating current source 3 to a coil 2, an alternating magnetic flux $\phi$ is generated between magnetic poles 5p, 5q of an iron core 5. A steel sheet 31 to be plated is guided by guide drums 35, 36 and is disposed in the upper and lower direction so as to pass through an upper and lower opening container 6. Molten metal 7, used for plating, is poured into the upper and lower opening container 6 and the steel sheet 31 is continuously transferred upwardly via the guide drums 35, 36. Then the molten metal 7, within the upper and lower opening container 6, sticks to the entire surface of the steel sheet 31 and a plated steel sheet 32 is obtained. The plated steel sheet 32 so obtained has a finely finished plated surface without roll scratching or dross sticking.

As shown in FIG. 6, the molten metal 7 is supplied via a supply piping 51 from a vessel 53, which stores a previously molten metal material 50 for plating with the temperature being adjusted (means not shown), to the upper and lower opening container 6 by a molten metal pump P or an electromagnetic pump (not shown) etc. and is returned via a discharge piping 52 from container 6 to vessel 53 by the force of gravity. At the discharge piping 52, a flow control means (valve, electromagnetic brake, etc.) 54 is provided, and with the revolution of the molten metal pump P or an electromagnetic pump (not shown) and/or with the flow control means 54 being adjusted, the liquid level of the container 6 is adjusted. The pump P is driven by a motor M.

FIG. 7 shows an example of a molten metal holding apparatus applied to a continuous plating apparatus including its upstream and downstream apparatus. A steel sheet 31, fed from a feeding device (not shown), is first pretreated, such as by washing, degreasing, etc. by a plating pretreatment apparatus 60. Then the sheet passes through an annealing furnace 61 having a heating zone, a soaking zone and a cooling zone. The sheet then makes a direction change at a guide drum 35, and then enters into a plating apparatus 65 so as to be plated. Then, an adjustment is made to a predetermined plating thickness at a plating thickness adjusting means 62, and via a cooling zone 63 and a guide drum 36, the steel sheet 31 is wound by a winder (not shown). Between the plating thickness adjusting means 62 and the cooling zone 63, an alloying furnace 64 is sometimes provided.

In FIG. 4, as the steel sheet 31 to be plated moves upwardly so as to cut the alternating magnetic flux $\phi$ generated between magnetic poles 5p, 5q, an induction current is generated within the steel sheet 31 to be plated so that a Lorentz's electromagnetic force is generated in a direction which will hinder the movement of the steel sheet 31 to be plated, that is, in the downward direction. Then, at the molten metal 7 contacting the steel sheet 31 to be plated, a current which is on a return way of the current flows in the opposite direction. Accordingly, the direction of the electromagnetic force generated in the molten metal 7 becomes upwardly directed so that the molten metal 7 is supported by this electromagnetic force and is held within the upper and lower opening container 6. As the current, flowing in the molten metal 7 in the opposite direction of the current flowing in the steel sheet 31, is strong at the portion near the steel sheet 31 and is weak at a portion apart therefrom, the molten metal 7 in this molten metal holding apparatus having the solid conductors 8 is supported only at the portion where the electromagnetic force is strong, hence a stable holding of the molten metal 7 is ensured.

Figure 2:
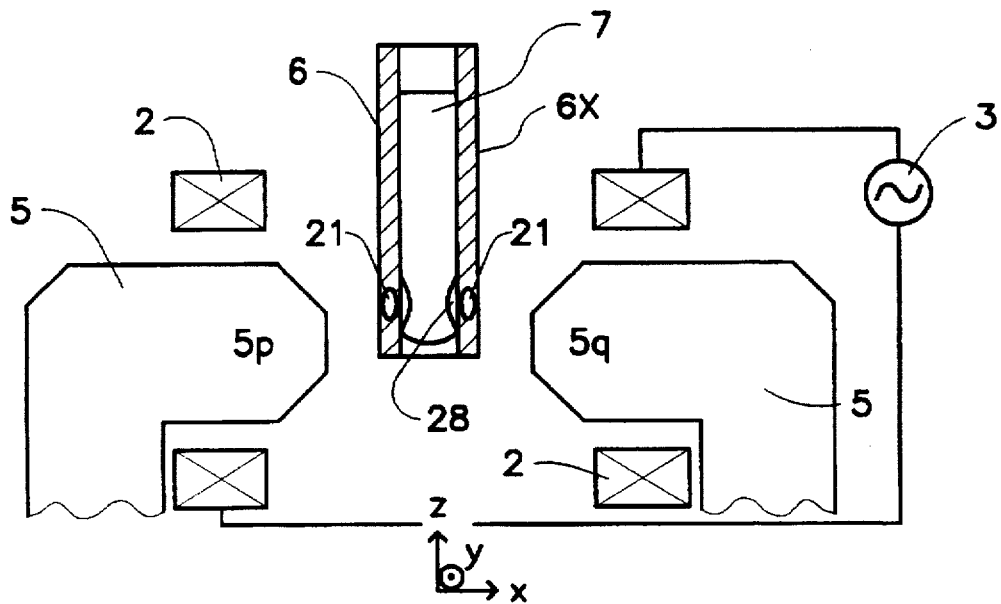
FIG. 2 is a longitudinal sectional view of a molten metal holding apparatus of a second preferred embodiment according to the present invention.

A molten metal holding apparatus of a second preferred embodiment according to the present invention is described with reference to FIG. 2. In FIG. 2, numeral 2 designates a coil, numeral 3 designates an alternating current source and numeral 5 designates an iron core, which together generate an alternating magnetic flux $\phi$ between magnetic poles $5p$, $5q$ and support a molten metal by an electromagnetic force, same as mentioned above. In FIG. 2, a cooling water pipe 21 is provided at a portion where the alternating magnetic flux $\phi$ passes through the lower portion of both side plates $6x$ of an upper and lower opening container 6. At the cooling water pipe 21, a cooling water supply means (not shown) is provided. Upon an alternating current being supplied to the coil 2 from the alternating current source 3 to generate an alternating magnetic flux $\phi$ between magnetic poles $5p$, $5q$ and the molten metal 7 being supplied into the upper and lower opening container 6, at the portions where the molten metal 7 contacts both side plates $6x$ of the lower portion of the upper and lower opening container 6, the molten metal 7 solidifies to become solidified metals or metal portions 28 and sticks. By virtue of the solidified metals 28, a function and effect to hold the molten metal 7 stably at a portion where the upward force of the electromagnetic force is strong, as mentioned above, is obtained.

Figure 5:
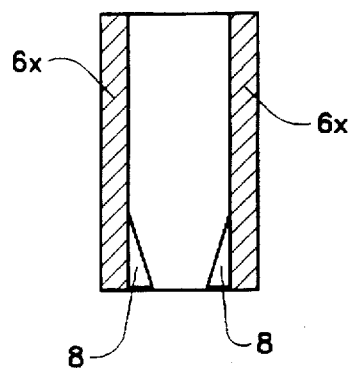
FIGS. 5(A), 5(B), 5(C) and 5(D) show longitudinal sectional views of variations of solid conductors fitted to an upper and lower opening container of a molten metal holding apparatus according to the present invention.
FIG. 5(E) is a plan view of the upper and lower opening container.
Figure 5:
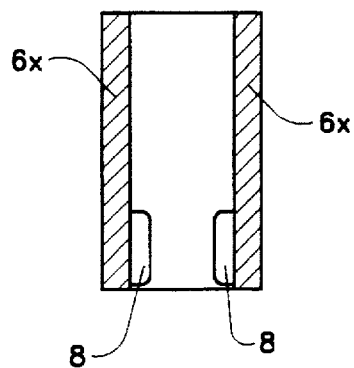
Figure 5:
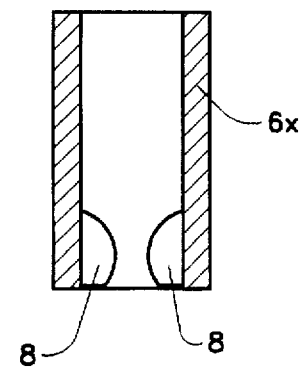
Figure 5:
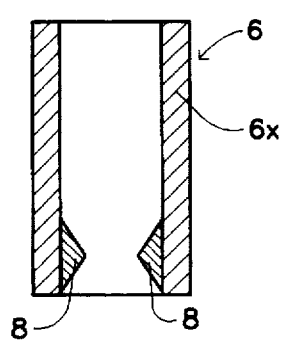
Figure 5:
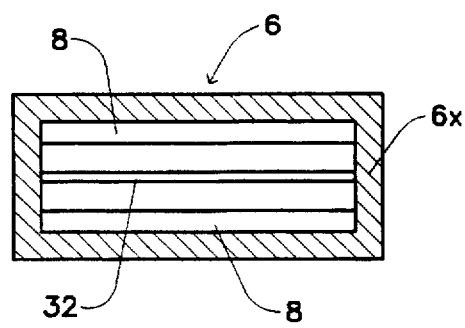

FIGS. 5(A) to (D) show variations of solid conductors 8 fitted within the upper and lower opening container 6, wherein FIG. 5(A) is of triangular sectional shapes, as mentioned above, FIG. 5(B) is of belt-like shapes, FIG. 5(C) is of partially cut-out column shapes and FIG. 5(D) is of triangular sectional shapes. FIG. 5(E) is a plan view of the upper and lower opening container 6. Other shapes of the solid conductors than those illustrated here can be also used.

A preferred embodiment of a molten metal holding apparatus having solid conductors 8 as shown in FIG. 5(A) is described. A Wood's metal of a head pressure of 1300 mmAq is enclosed in an upper and lower opening container 6, an alternating current of a frequency of 2 kHz is supplied from an alternating current source 3 to a coil 2 wound around an iron core 5 and an alternating magnetic flux of a magnetic flux density of 0.3 T in the X axis direction is generated between magnetic poles $5p$, $5q$. In this case, without a leakage from a lower opening of the upper and lower opening container 6, the Wood's metal can be held stably.

According to the apparatus of the first and the second preferred embodiments, as solid conductors fitted to the lower inner surfaces of both side plates of an upper and lower opening container make up portions where a levitating electromagnetic force is weak and as a molten metal is supported at a portion where an upward force of the electromagnetic force is strong, a molten metal holding apparatus which is able to hold a molten metal can stably be obtained.

Figure 8:
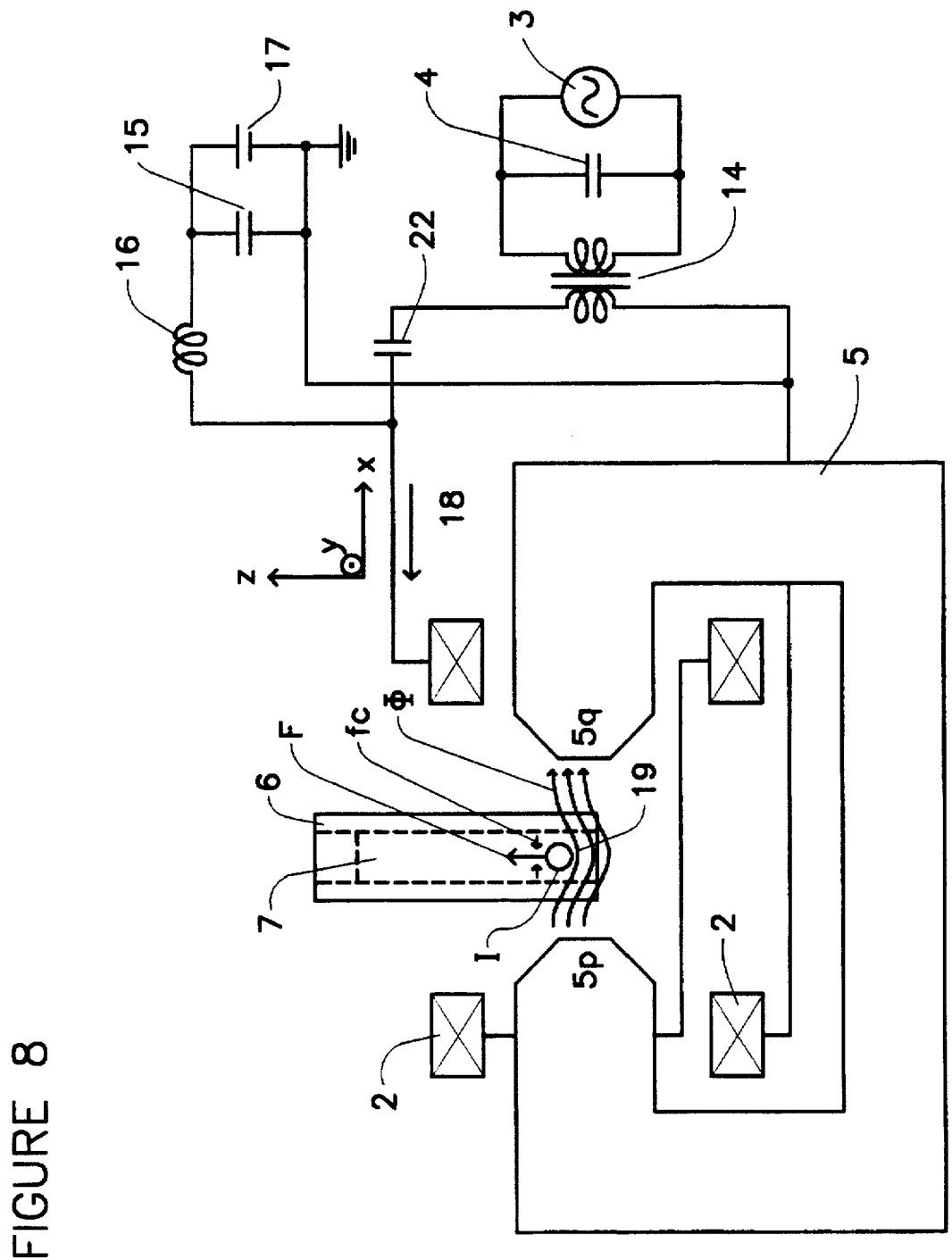
FIG. 8 is a structural drawing of a molten metal holding apparatus of a third preferred embodiment according to the present invention.

FIG. 8 shows a molten metal holding apparatus of a third preferred embodiment according to the present invention. In this preferred embodiment, a circuit provided to overlay a direct current on an exciting coil 2 is provided. As shown in the figure, an alternating current is supplied from an alternating current source 3 to the exciting coil 2 wound around an iron core 5 via a transformer 14 and rectifying condensers 4, 22 and a direct current is supplied from a direct current source 17 to exciting coil 2 via a rectifying condenser 15 and a rectifying reactor 16.

Figure 9:
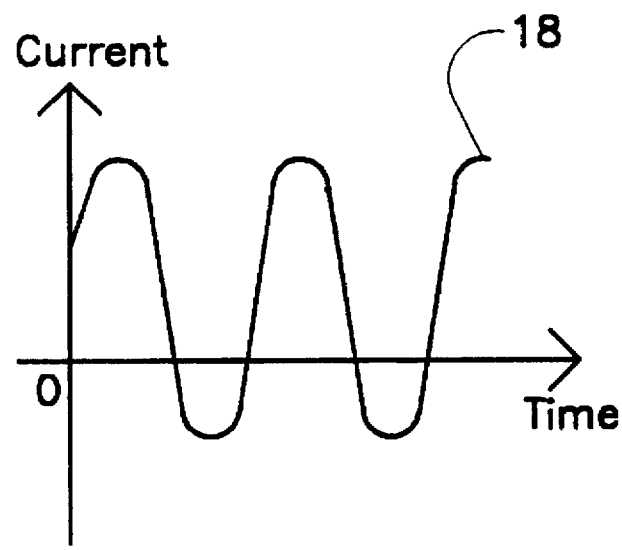
FIG. 9 is a graph showing wave shapes of an exciting coil current of a molten metal holding apparatus of a third preferred embodiment according to the present invention.
Figure 10:
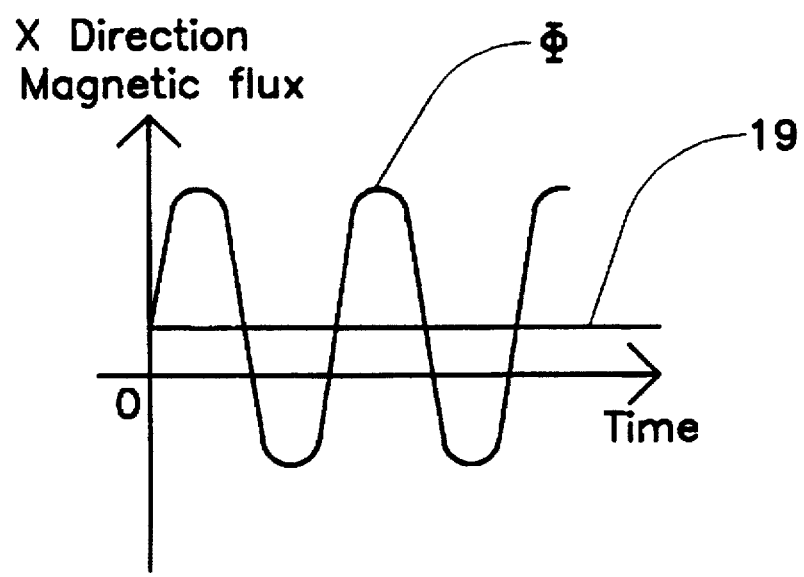
FIG. 10 is a graph showing wave shapes of a magnetic flux density of a molten metal holding apparatus of a third preferred embodiment according to the present invention.

Thereby, an exciting current 18 of wave-shapes in which a direct current is overlaid on an alternating current, as shown in FIG. 9, flows in the exciting coil 2, and an alternating magnetic flux $\phi$ in which a direct current component 19 is overlaid, as shown in FIG. 10, is generated between two magnetic poles $5p$, $5q$ of the iron core 5 in the right and left direction or X axis direction of FIG. 9. Incidentally, in FIG. 8, the rectifying condenser 15 and the reactor 16 are for the purpose that an alternating current component does not flow into the direct current source 17.

An upper and lower opening container 6 having an upper opening and a lower opening is disposed so that its lower end is positioned between magnetic poles $5p$, $5q$, which container 6 is of a rectangular tube shape wherein its horizontal cross section is a rectangular shape, and is made of a heat resistant insulating material, such as a ceramic, etc.

Within the upper and lower opening container 6, a molten metal 7 of a zinc, an aluminum, other metals or their alloys, etc. is contained.

Thus, in the molten metal 7, an alternating magnetic flux $\phi$ overlaid with a direct current component 19, as shown in FIG. 10, is generated in the right and left direction or X axis direction of FIG. 8, thereby an induction current I is generated in the front and back direction or Y axis direction of FIG. 8 and a levitating electromagnetic force F which is a reciprocal action between this induction current I and the alternating magnetic flux $\phi$ acts upwardly or in the Z axis direction of FIG. 8 by Fleming's rule.

Here, the direct current supplied from the direct current source 17 generates a direct current component 19 at the alternating magnetic flux $\phi$ between magnetic poles $5p$, $5q$, and the alternating current component of the alternating magnetic flux $\phi$ attenuates at the surface layer of the molten metal 7. Hence, on the inside of the molten metal 7, the direct current component 19 of the alternating magnetic flux $\phi$ acts strongly.

Accordingly, as a reciprocal action force of the induction current I and the direct current component 19 of the alternating magnetic flux $\phi$ acts as a breaking force in a direction to suppress a flow movement, a liquid flow movement within the molten metal receives an action to be reduced against a compression force fc acting in the X axis direction.

In this preferred embodiment as mentioned above, as a direct current is supplied to the exciting coil 2, a direct current component 19 is generated at the alternating magnetic flux $\phi$ and a waving movement of the molten metal 7 is prevented, thus the molten metal 7 can be held stably.

As a concrete example, when an electromagnet comprising an iron core 5 and an exciting coil 2, which has an inductance of 70 μH, a resistance of 0.01 Ω, a condenser 15 of 320 μF and a reactor 16 of 5 mH, is used, a flow of an exciting current in which an alternating current component is 500 A (frequency of 2 kHz) and a direct current component is 500 A, is possible, and an alternating magnetic flux of a X axis directional magnetic flux density in which a direct current component is 0.3 T and an alternating current component is 0.3 T, can be obtained. By use of this magnetic flux, a Wood's metal used as a molten metal can be held stably.

Figure 11:
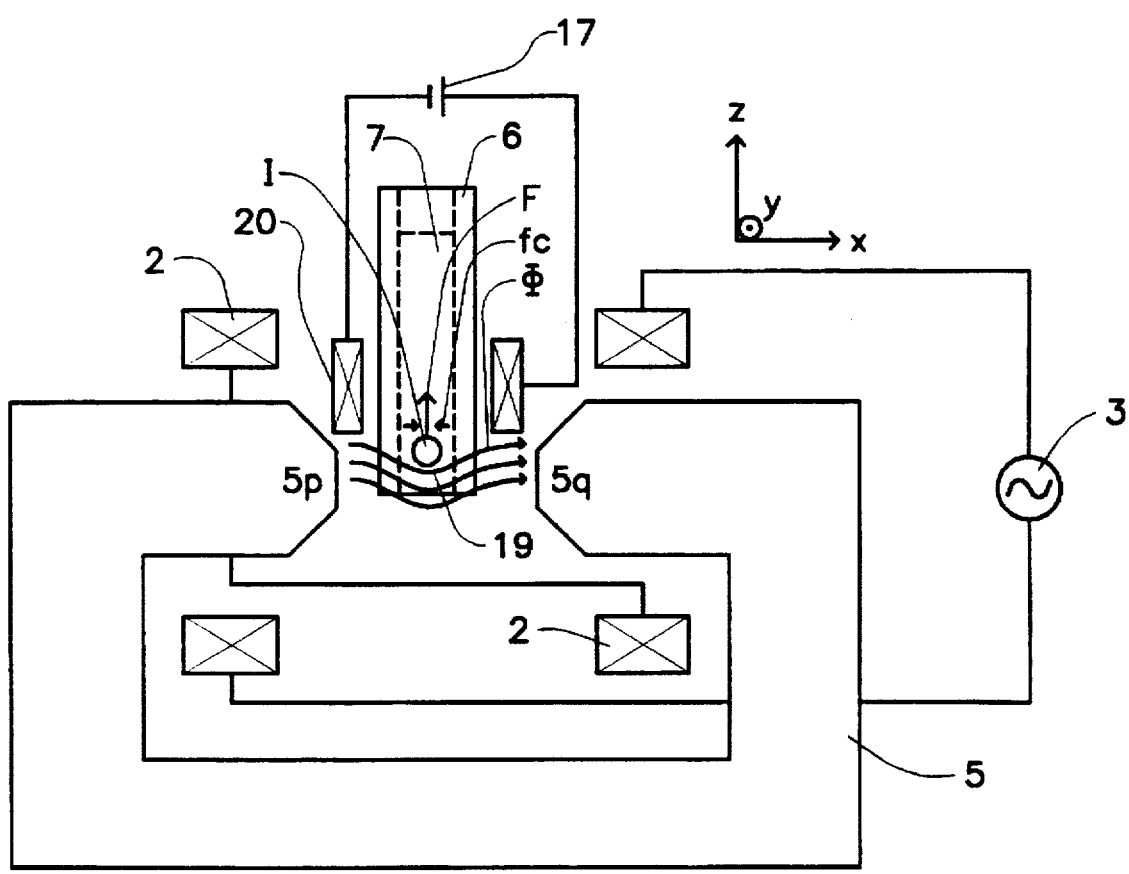
FIG. 11 is a structural drawing of a molten metal holding apparatus of a fourth preferred embodiment according to the present invention.

A fourth preferred embodiment according to the present invention is shown in FIG. 11. In this preferred embodiment, instead of a circuit (16, 16, 17) to overlay a direct current on an exciting coil 2, an exciting device 20 to let a direct current magnetic flux act on a molten metal 7 is used.

The exciting device 20 is disposed respectively on both sides of an upper and lower opening container 6 and over magnetic poles 5p, 5q and these exciting devices 20 are connected to a direct current source 17. Upon a direct current being supplied to the exciting devices 20 from the direct current source 17, a direct current component 19 is generated in an alternating magnetic flux φ.

In this preferred embodiment also, same as previously mentioned preferred embodiments, as a direct current component 19 is generated in an alternating magnetic flux φ, a liquid flow movement within a molten metal is reduced against a compression force fc acting in the X axis direction, a waving movement of the molten metal 7 is prevented and the molten metal 7 can be held stably.

Figure 12:
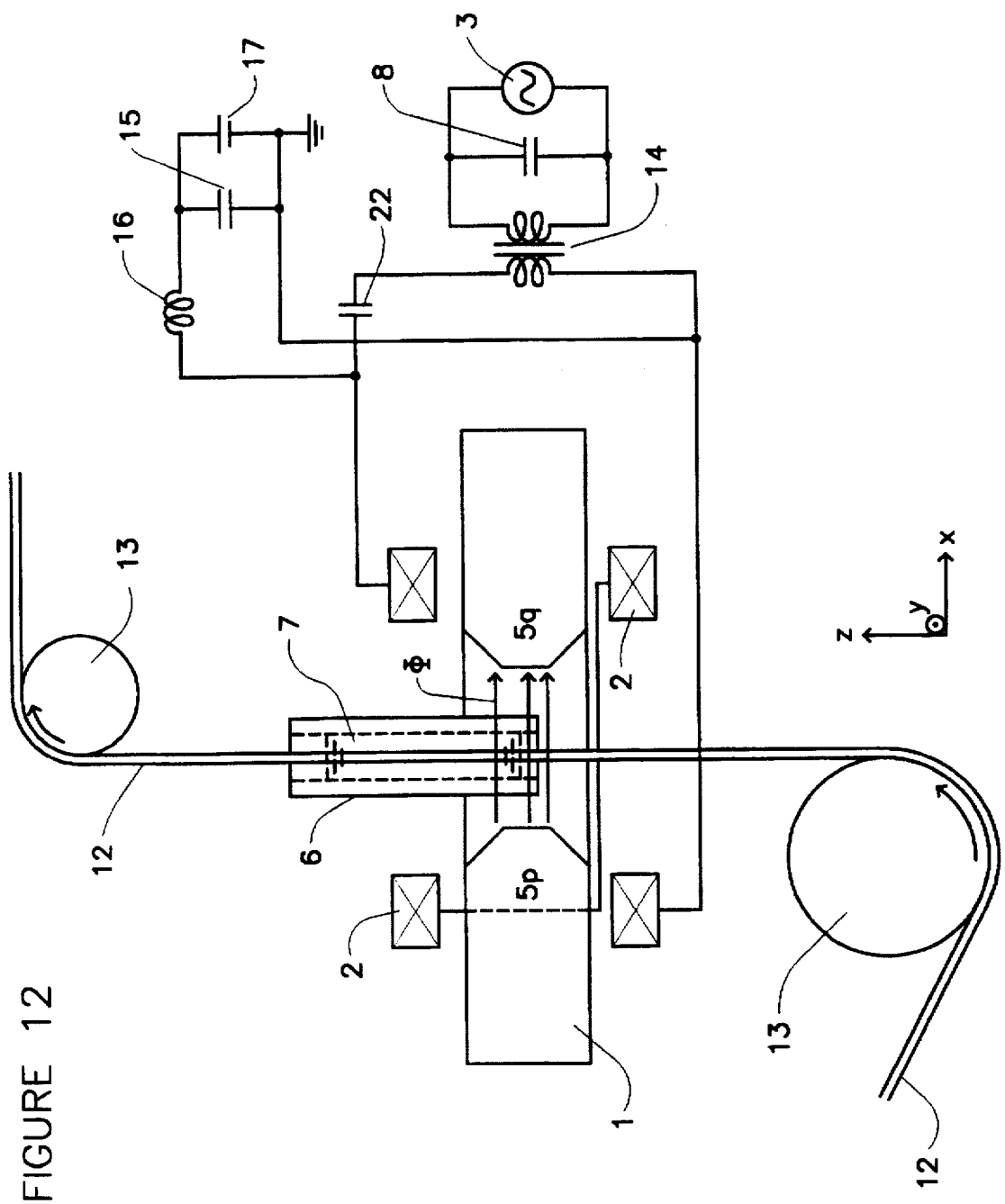
FIG. 12 is a structural drawing showing an example where a molten metal holding apparatus of the fourth preferred embodiment according to the present invention is applied to a steel sheet plating apparatus.
Figure 13:
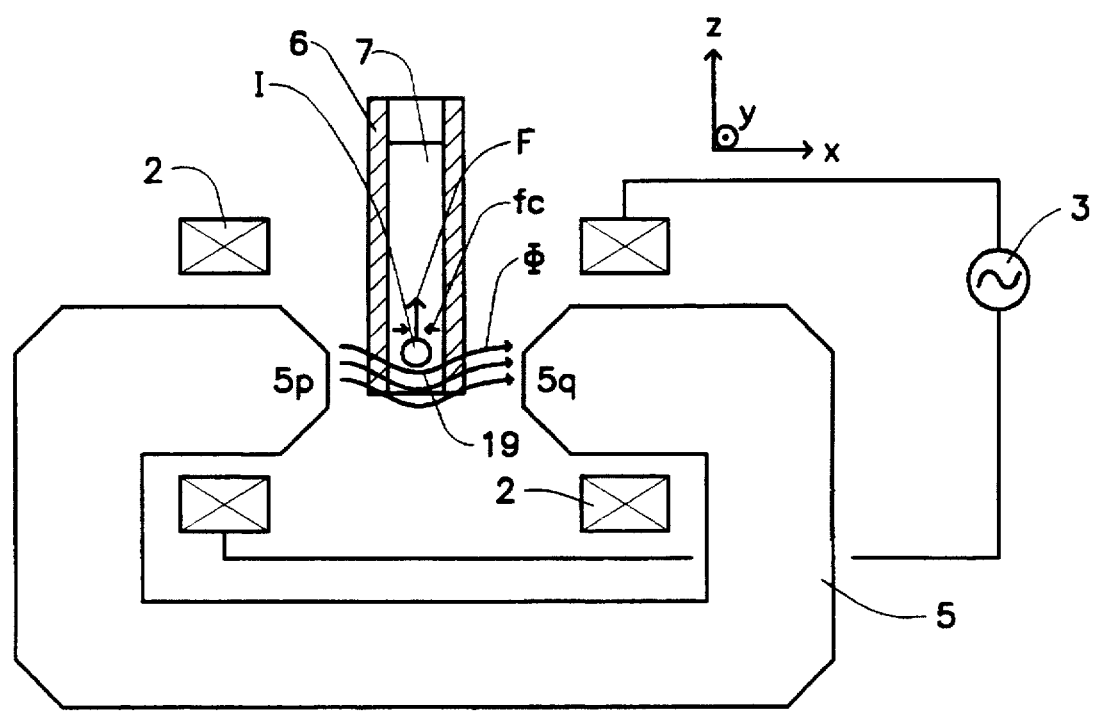
FIG. 13 is a structural drawing of a molten metal holding apparatus in the prior art.

A molten metal holding apparatus according to the present invention can be applied to a steel sheet plating apparatus as shown in FIG. 12. That is, a steel sheet 12 extending between drums 13 is passed through within a molten metal 7 and the lower portion of the molten metal 7 is sealed noncontact-wise, thereby a plating apparatus can be made compact and an enhancement of changeability of a plating liquid can be attained. There are further advantages that by said construction being connected in multi-stages, a multi-layer plating process becomes facilitated, etc.

According to the third preferred embodiment, a circuit to overlay a direct current on an exciting coil is attached, and according to the fourth preferred embodiment, a device to let a direct current magnetic flux act on a molten metal is attached, hence a direct current component is generated in an alternating magnetic flux. Thus, a reciprocal action force of the induction current and the direct current component of the alternating magnetic flux acts in a direction to suppress a flow movement of the molten metal, a flow movement within the molten metal is reduced and the molten metal is held stably.

While a principle of the present invention has been described above, it is intended that all matter contained in the above description and illustrated in the accompanying drawings shall be interpreted to be illustrative and not as a limitation to the scope of the invention.

What is claimed is:

1. A molten metal holding apparatus comprising:
   a vertically oriented container having a first side plate, a second side plate disposed opposite to said first side plate, and open upper and lower ends;
   a means for generating an alternating magnetic flux at a lower end portion of said container such that molten metal is held within said container by an electromagnetic force;
   a first solid conductor, formed of a conductive material, attached to an inner surface of said first side plate at a location where the alternating magnetic flux passes through said lower end portion of said container; and
   a second solid conductor, formed of a conductive material, attached to an inner surface of said second side plate at a location where the alternating magnetic flux passes through said lower end portion of said container, wherein said conductive material forming said first and second conductors is not a strong magnetic substance and said material is selected so that it has a conductivity which is of the same degree as the molten metal held in said container.

2. The molten metal holding apparatus as claimed in claim 1, wherein:
   said first solid conductor and said second solid conductor each have a cross-section, taken along a plane perpendicular to said first and second side plates, which is generally triangular, and
   said triangular cross-sections each have a lowermost side which is horizontal, a vertical side which is attached to said first and second side plates, respectively, and an inclined side which extends upwardly toward said first and second side plates, respectively.

3. A molten metal holding apparatus comprising:
   a vertically oriented container having a first side plate, a second side plate disposed opposite to said first side plate, and open upper and lower ends;
   a means for generating an alternating magnetic flux at a lower end portion of said container so that molten metal can be held within said container by an electromagnetic force; and
   a cooling water pipe provided in said first and second side plates at a location where the alternating magnetic flux passes through said lower end portion of said container so that, when molten metal is supplied to said container, portions of the molten metal will solidify and stick to said first and second side plates at said lower portion of said container.

4. A molten metal holding apparatus comprising:
   a vertically oriented container having a first side plate, a second side plate opposing said first side plate, and open upper and lower ends;
   an exciting coil which generates an alternating magnetic flux in a horizontal direction at a lower end portion of said container to hold a molten metal within said container by an electromagnetic force; and
   a circuit which overlays a direct current on an alternating current produced by said exciting coil.

5. A molten metal holding apparatus comprising:
   a vertically oriented container having a first side plate, a second side plate opposing said first side plate, and open upper and lower ends;
   an exciting coil which generates an alternating magnetic flux in a horizontal direction at a lower end portion of said container to hold a molten metal within said container by an electromagnetic force; and
   an exciting device located outwardly of said first and second side plates, wherein upon supply of a direct current to said exciting device a direct current magnetic flux is generated and forms a component of said alternating magnetic flux such that said direct current magnetic flux acts on molten metal held in said container.

6. A molten metal plating apparatus comprising:
   a vertically oriented container having a first side plate, a second side plate opposing said first side plate, and open upper and lower ends such that an element to be plated can be passed through said container from said lower open end to said open upper end;
   an exciting coil means, provided around an outer perimeter of a lower end portion of said container, for generating an alternating magnetic flux so that molten metal can be held within said container by an electromagnetic force;
   a first solid conductor attached to an inner surface of said first side plate at a location where the alternating magnetic flux passes through said lower end portion of said container, wherein said first solid conductor has a conductivity which is of the same degree as the molten metal held within said container; and a second solid conductor attached to an inner surface of said second side plate at a location where the alternating magnetic flux passes through said lower end portion of said container, wherein said second solid conductor has a conductivity which is of the same degree as the molten metal held within said container.

7. The molten metal plating apparatus as claimed in claim 6, further comprising:

a pretreatment means for washing and degreasing the element to be plated;

an annealing means for annealing the element to be plated after it has been pretreated by said pretreatment means;

a means for moving the element to be plated through said container from said lower open end to said upper open end;

a plating thickness adjusting means, disposed downstream of said container; and a means for forming a cooling zone disposed downstream of said plating thickness adjusting means.

* * * * *